N. McKay.
Wheel Cultivator.
No. 93,730. Patented Aug. 17, 1869.

Witnesses,
A. D. Workman
Wm. C. Yager

Inventor,
Neal McKay

UNITED STATES PATENT OFFICE.

NEAL McKAY, OF COLUMBIA, MISSOURI.

IMPROVEMENT IN CULTIVATOR-PLOWS.

Specification forming part of Letters Patent No. 93,730, dated August 17, 1869.

*To all whom it may concern:*

Be it known that I, NEAL McKAY, of Columbia, Boone county, Missouri, have invented a new and useful Improved Cultivator-Plow; and I do hereby declare that the following is a full and exact description thereof, reference being had to the accompanying drawings, making a part of this specification, in which—

Figure 1:
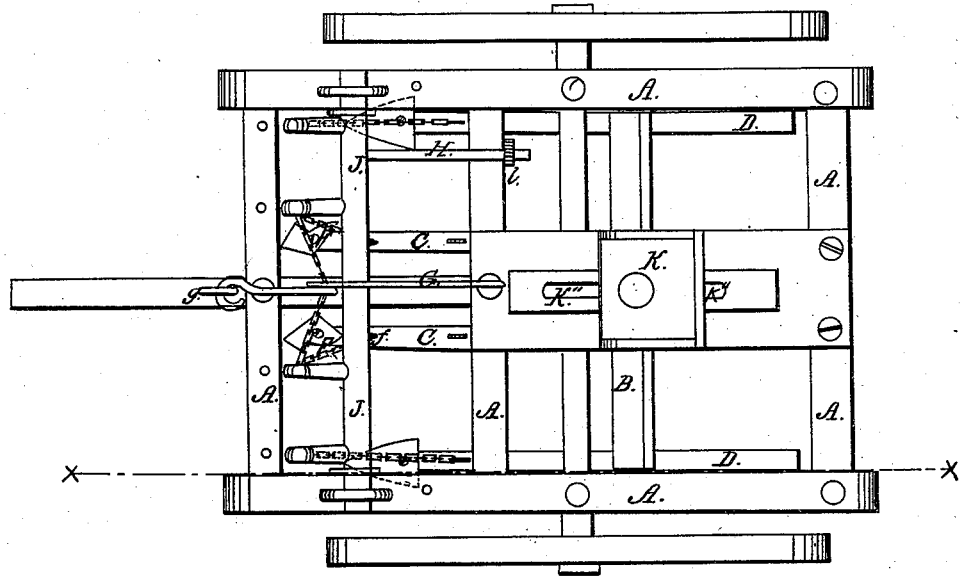
Figure 2:
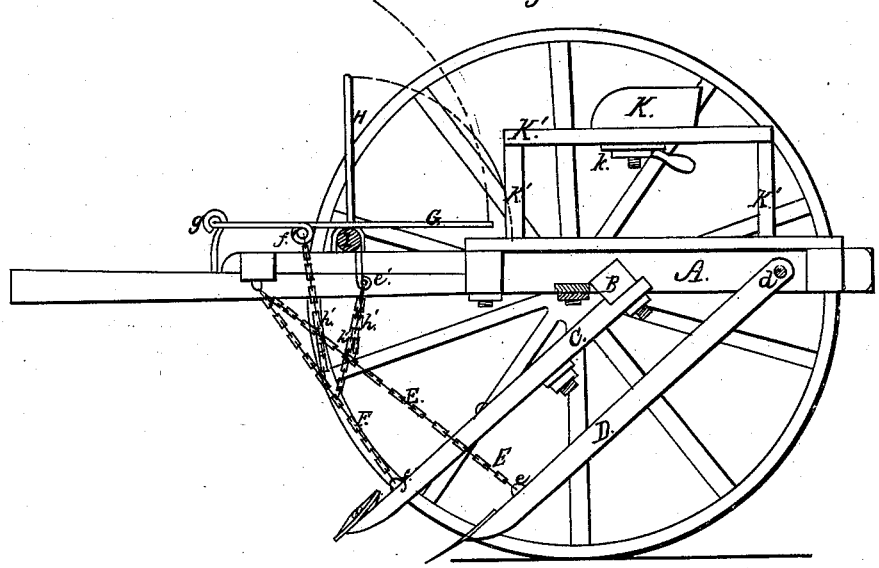

Figure 1 represents a plan view of the cultivator. Fig. 2 represents a horizontal section taken in the plane indicated by the line $x\,x$ in Fig. 1.

Similar letters of reference indicate corresponding parts in both figures.

The nature of this invention consists in a new combination and arrangement of the hand-levers for operating the plows, both the inner and adjustable and the outer ones pivoted to the rear of the main frame.

In order to give a clear understanding of my invention, I will fully describe the same, as shown in the drawings.

A represents the main frame of the cultivator; B, the rock-shaft, upon which the inner plow-beams are bolted; C C, the inner plow-beams, connected to each other through a cross-beam in the usual way; D D, rear plow-beams, bolted to the side of the main frame at $d$.

E E are chains connected with the rear plow-beams at $e$, and with the hand-lever rock-shaft at $e$, and finally fastened to the front piece of the main frame A.

F F are chains connected with the inner and front plow-beams at $f$, and with hand-lever at $f'$, and finally with the frame A.

G is the hand-lever for raising and cleaning the inner plows, and is connected to the tongue by the eyebolt $g$, and with the plow-chains at $f$.

H is a hand-lever, with four arms attached to its rock-shaft, the four plow-beams being connected to the arms through short supplemental chains $h\,h\,h\,h$.

I is the hand-lever rock-shaft for elevating all the plows.

K is the seat, bolted to its frame K', which is slotted to receive the bolt at R, and secured by the nut $k$.

$l$ is the fastening for holding the lever H, and thus keeping all the plows in an elevated position. The seat-frame is placed upon a small platform, extending from the rear cross-piece of the frame to a second cross-piece in front of the axle. The rock-shaft for the inner plows is arranged just in the rear of the axle, and is perforated at various distances apart, according as the corn is small or large. By elevating the hand-lever G, the inner plows may be raised and cleared and all trash shaken off, without leaving the seat or using the feet. The main-lever rock-shaft has four arms connected to the four plow-beam chains. By an easy movement of the hand-lever H, the plows may all be raised to pass over any obstruction. The lever is fastened under a pivoted catch at $l$, and thus all the plows held raised. Thus it will be seen that a combination of the various parts and such an arrangement is made that the weight of the driver is perfectly adjusted through a movable seat. An upward movement of a hand-lever clears the inner plows, adjustably arranged on the rock-shaft in the rear of the axle, and lifts them independently of the other plows. A movement of the main hand-lever H elevates all the plows.

I do not claim any of the devices separately; but

What I do claim, and desire to secure by Letters Patent, is—

The combination and arrangement of the rear plows, D, fastened to the main frame, the inner and front plows, C, adjustably secured upon the rock-shaft B, the hand-lever G, pivot $g$, and chains F F to the inner plows, and the hand-lever H, with its four-armed rock-shaft and chains $h\,h\,h\,h$, for lifting the four plows, secured by the catch $l$, with the adjustable seat K.

N. McKAY.

Witnesses:
PETER SALMON,
E. McKAY.